Aug. 19, 1924.

E. D. TREANOR 1,505,822

SYSTEM OF ELECTRIC DISTRIBUTION

Filed May 24, 1923

Inventor:
Edward D. Treanor,
by
His Attorney.

Patented Aug. 19, 1924.

1,505,822

UNITED STATES PATENT OFFICE.

EDWARD D. TREANOR, OF PITTSFIELD, MASSACHUSETTS, ASSIGNOR TO GENERAL ELECTRIC COMPANY, A CORPORATION OF NEW YORK.

SYSTEM OF ELECTRIC DISTRIBUTION.

Application filed May 24, 1923. Serial No. 641,238.

*To all whom it may concern:*

Be it known that I, EDWARD D. TREANOR, a citizen of the United States, residing at Pittsfield, county of Berkshire, State of Massachusetts, have invented certain new and useful Improvements in Systems of Electric Distribution, of which the following is a specification.

My invention relates to systems of electric distribution and particularly to such systems in which a distribution circuit receives power from a supply circuit through a plurality of parallel feeders.

Certain difficulties arise in such systems which prevent entirely satisfactory operation. One difficulty is that the load connected to the distribution circuit may not be uniformly distributed, but may be concentrated at points near particular feeders in such a way that the relative impedances of the parallel circuits between the supply circuit and the load prevent a satisfactory division of the load between the feeders. One of the principal objects of my invention is an improved system of distribution whereby this difficulty may be prevented and a more satisfactory distribution of the load on all of the feeders may be obtained.

It is also usually considered desirable to be able to supply as much energy as possible to a fault in the distribution circuit in order that the fault may be burned off and the circuit cleared of the trouble. In ordinary systems the feeder nearest the trouble is overloaded more than the other feeders so that the fuses or other protective devices, which are usually provided, operate to open circuit this feeder. The opening of this feeder increases the load carried on the next nearest feeder so that the protective devices in this feeder operate. In this manner it is possible to open circuit all of the feeders before the fault is burned off. Another object of my invention is to provide an improved system of distribution whereby this difficulty may be prevented by distributing any overload or short circuit uniformly over all of the feeders so that a maximum current can flow into a fault without concentrating the load on the feeder or feeders nearest the fault.

My invention will be better understood from the following description taken in connection with the accompanying drawing and its scope will be pointed out in the appended claims.

Figure 1:
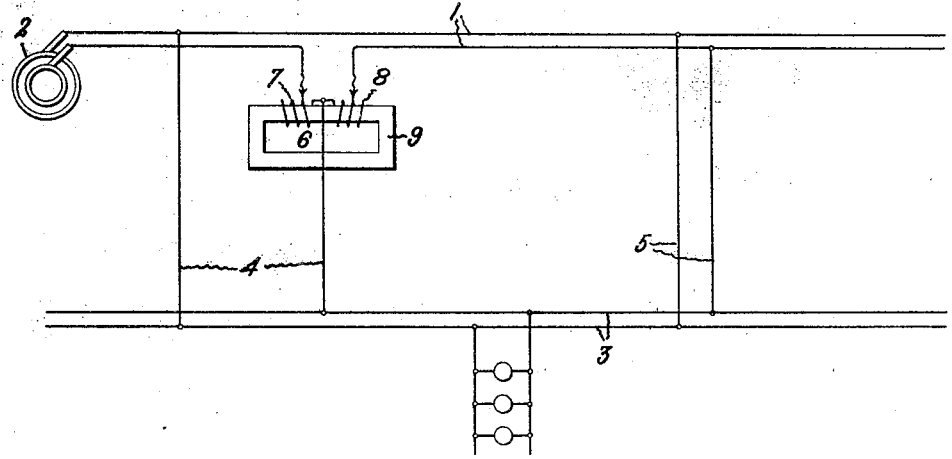
Figure 2:
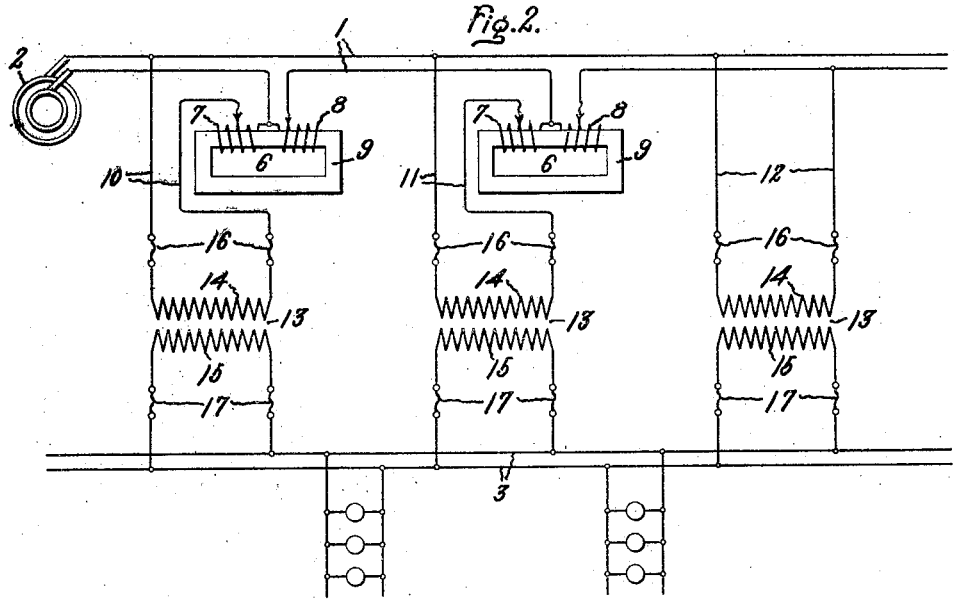

Referring to the drawing, Fig. 1 is a diagram of a simple system of electric distribution embodying my invention and Fig. 2 is a modification of the arrangement shown in Fig. 1.

Referring to Fig. 1, 1 represents a single phase alternating current supply circuit receiving energy from an alternator 2 and supplying current to a distribution circuit 3 by means of the parallel feeders 4 and 5, only two of which are shown. My invention, however, is not limited to any particular number of parallel feeders or any particular number of phases.

A balancing transformer 6 is connected in supply circuit 1, at the point where the feeder 4, which is nearer the source 2, than the feeder 5 is connected thereto. The balancing transformer 6 is provided with two windings 7 and 8 wound in opposite directions on an iron core 9 and connected in series with the supply circuit. Suitable means are provided whereby the number of turns of each winding, connected in series with the supply circuit, may be adjusted. One of the wires of feeder 4 is connected to the supply circuit at a point between the two windings 7 and 8.

The number of turns of each winding in series with the supply circuit is arranged so that the ampere turns of both windings are the same when there is the desired division of current between the parallel feeders. If in the arrangement shown in Fig. 1 it is desired to have each feeder supply the same amount of current, there are twice as many turns of the winding 8 connected in series with the supply circuit 1 as there are turns of the winding 7 because the current through the winding 7 is twice the current through the winding 8 when the currents in the two feeders are equal. Since the two windings oppose each other there is no flux produced in the iron core 9 under these conditions. Any tendency however to upset the desired balance of current produces a flux in the core of the balancing transformer, which causes one of the windings to act as a reactance and induces a voltage in the other winding.

For example, if for any reason, because of such an unequal distribution of the load connected to the distribution circuit, the current through the feeder 4 exceeds the current through the feeder 5, the ampere turns of the winding 7 exceed the ampere turns of the winding 8. Consequently a flux is produced in the core 9 which increases the reactance of winding 7, which is in series with the feeders 4 and 5, and at the same time induces a voltage in the winding 8, which tends to increase the current through the feeder 5. If, however, the current through the feeder 5 exceeds the current through the feeder 4 the ampere turns of the winding 8 exceeds the ampere turns of the winding 7. Consequently a flux is produced in the core 9 which increases the reactance of the winding 8 so that the current through the feeder 5 decreases and at the same time a voltage is induced in the winding 7 which increases the current through the feeder 4. From the foregoing it is evident that the balancing transformer 6 tends to maintain the currents in the two feeders equal at all times. Therefore in case of a short circuit or other fault on the distribution circuit both feeders will be loaded equally and the maximum current will be supplied to the short circuit to burn it off without concentrating the load on the feeder nearest the short circuit.

In the system shown in Fig. 2, three feeders 10, 11 and 12 connect the supply circuit 1 to the load circuit 3. Usually the voltage of the supply circuit is very much higher than the voltage of the distribution circuit so that distributing transformers are connected in each feeder to reduce the voltage to the desired value. Each one of the feeders 10, 11 and 12 has connected therein a distributing transformer 13 the primary winding 14 of which is connected to the supply circuit and the secondary winding 15 of which is connected to the distribution circuit 3. Suitable fuses 16 and 17 are provided in series respectively with the primary winding 14 and the secondary winding 15 of each transformer.

A balancing transformer 6 is provided at each point where a feeder is connected to the supply circuit except at the point where the feeder farthest away from the generator 2 is connected thereto. Since all of the current in the supply circuit at this latter point is supplied to the feeder connected at that point, no balancing transformer is required. Each balancing transformer is similar in construction to the one shown in Fig. 1 except that the winding 7 is so connected that only the current, which is supplied to the feeder associated therewith, flows through this winding. The number of turns of each winding 8, in series with the supply circuits, depends upon the location of the winding in the supply circuit. In the transformer 6 nearest the generator, the current in the winding 7 is the primary current of only one distributing transformer whereas the current in the winding 8 is the primary current of two distributing transformers. Therefore in order to maintain an equal division of the current between the feeders, the number of turns of the winding 7 and 8 is adjusted so that the ratio of the turns of the winding 7 to the turns of the winding 8 is 2 to 1.

Similarly in the second transformer 6 the current in the winding 7 is the primary current of one distributing transformer and the current in the winding 8 is the primary current of one distributing transformer. Therefore in this balancing transformer 6 the ratio of the number of turns of the winding 7 to the number of turns of the winding 8 is 1 to 1.

The operation of the system shown in Fig. 2 is believed to be obvious from the description given above in connection with Fig. 1 so that a description as to how the balancing transformers 6 tend to maintain the proper division of load between the feeders, when all of the transformers are in operative condition and there is an unequal distribution of the load connected to the distribution circuit, is deemed unnecessary.

In case a fault develops in one of the transformers the primary fuses of the transformer will blow immediately so that there is a reverse flow of current from the distribution circuit to the secondary winding of the defective transformer, the energy coming from the other transformers connected in parallel so that these transformers in addition to carrying the load which the defective transformer was carrying also have to carry enough current to blow the secondary fuses 17 of the defective transformer. If no balancing transformers were used, the additional load thrown on the transformer nearest the defective transformer would probably be great enough to blow its fuses, thus shifting the heaviest portion of the load to the next nearest transformer with a similar result until all of the transformers would become disconnected from the system. When balancing transformers 6 are used, however, these transformers tend to maintain the desired division of load so that it is impossible for any one feeder to supply all or a large portion of the short circuit current to the defective transformer. Let it be assumed, for example, that the transformer 13 in the feeder 11 becomes defective. The primary fuses 16 in this feeder then blow so the entire load connected to the load circuit as well as the short circuit current supplied to the defective transformer from the distribution circuits 3 is carried by the two feeders 10 and 12. The balancing transformer 6 at the point where the feeder 10 is connected to the supply circuit operates to maintain twice as much current flowing through the winding 8 as flows through the winding 7 thereof. Since all of the current through winding 8 is now supplied to the feeder 12 the current supplied through the feeder 12 is twice as much as the current supplied through feeder 10. Therefore, while the feeder 12 may be considerably overloaded until the fuses 17 in the secondary circuit of the defective transformer blow, it only carries ⅔ of the short circuit current instead of substantially all of it as would be the case if the feeder 12 were very close to the defective transformer 13 and no balancing transformers were provided.

Since both of the feeders 10 and 12 are dividing the short circuit current which is usually several times greater than normal full load, the total current through either one of the feeders is less than the total short circuit current flowing through the secondary winding 15 of the defective transformer. Therefore the secondary fuses 17 in the secondary circuit of the defective transformer will be the first to blow so that the defective transformer is completely disconnected from the supply and load circuits without effecting the disconnection of any of the other transformers. After the defective transformer is disconnected the feeder 12 will continue to carry twice as much load as the feeder 10 until either the number of turns of the winding 8 of the balancing transformer 6 nearest the source 2 is changed or an operative distributing transformer 13 is connected in the feeder 11.

It will be apparent that if the transformer 13 in the feeder 10 becomes defective and its primary fuses 16 blow, the balancing transformer 6 in the supply circuit at the point where the feeder 11 is connected to the supply circuit causes the short circuit current supplied to the secondary winding of the defective transformer to be equally divided between the feeders 11 and 12 so that the secondary fuses 17 in the secondary circuit of the defective transformer will be the first to blow. After the defective transformer has been completely disconnected the feeders 11 and 12 will equally divide the current supplied to the distribution circuit.

By means of my arrangement it is evident that whenever a distributing transformer becomes defective it is automatically disconnected from both the supply circuit and the distribution circuit without effecting the disconnection of any of the other transformers. Also whenever a transformer is disconnected or is rendered inoperative, the balancing transformers tend to divide the load connected to the distribution circuit in the following manner. All of the balancing transformers connected in the supply circuit at points nearer the source than the point where the feeder associated with the disconnected distribution transformer is connected tend to maintain the same predetermined proportion of the total current in the feeders associated therewith, as under normal conditions. All of the balancing transformers connected in the supply circuit at points farther away from the source than the point where the feeder associated with the disconnected distribution transformer is connected will equally divide the predetermined proportion of the total current normally carried by the disconnected feeder. Therefore it will be observed that when there are several feeders connected to the supply circuit at points beyond the point where the disconnected feeder is adapted to be connected, the additional load on each one of these feeders is not very much greater than the normal load as the additional load varies inversely with the number of feeders.

While I have shown the windings of the balancing transformers connected directly in series with the different circuits it is apparent that the windings could be connected thereto by means of current transformers and I desire it to be understood that I intend to cover in the appended claims such a connection by the expression "connected in series" with a circuit.

While I have shown and described several modifications of my invention, I do not desire to be limited to the exact arrangements shown and described but seek to cover in the appended claims all those modifications that fall within the true spirit and scope of my invention.

What I claim as new and desire to secure by Letters Patent of the United States, is:

1. A system of electric distribution comprising a source of alternating current, an alternating current supply circuit connected to said source, a plurality of parallel feeders connected to different points of said alternating current supply circuit and feeding into a common circuit, and a plurality of balancing transformers, each transformer being associated with a different one of said feeders and comprising two differential windings, one of said windings being so connected that the current therethrough varies with the current flowing through the feeder with which the transformer is associated, and the other one of said windings being so connected that the current therethrough is proportional to the current supplied to the distribution circuit through the feeders connected to the supply circuit at points farther away from the source than the point where the feeder associated with the transformer is connected, said windings being so arranged that the flux in each transformer is zero when there is a predetermined division of current between said feeders.

2. A system of electric distribution comprising a source of alternating current, an alternating current circuit connected to said source, a plurality of parallel feeders connected to different points of said alternating current circuit and feeding into a common circuit, and a plurality of balancing transformers, each transformer being associated with a different one of said feeders and comprising two differential windings, one of said windings being so connected that the current therethrough varies with the current flowing through the feeder with which the transformer is associated, and the other one of said windings being connected in series with the said alternating current circuit at a point farther away from said source than the point where the feeder associated with the transformer is connected thereto, said windings being so arranged that the flux in such transformer is zero when the currents in all of the feeders are equal.

3. A system of electric distribution comprising a source of alternating current, an alternating current supply circuit connected to said source, a plurality of parallel feeders connected to different points of said alternating current supply circuit and feeding into a common circuit, and a plurality of balancing transformers, each transformer being associated with a different one of said feeders and comprising two differential windings, one of said windings being connected in series with the feeder with which the transformer is associated, and the other one of said windings being connected in series with said alternating current supply circuit at a point farther away from said source than the point where the feeder associated with the transformer is connected thereto so that the current through said last mentioned winding is proportional to the current supplied to the feeders connected to the alternating current supply circuit at points farther away from the source, said windings being so arranged that the flux in each transformer is zero when the currents in all of the feeders are equal.

4. A system of electric distribution comprising a source of alternating current, an alternating current supply circuit connected to said source, a plurality of distributing transformers having their primary windings connected to different points of said alternating current supply circuit and their secondary windings connected to a common circuit, protective means in the secondary circuits of each transformer, and a plurality of balancing tranformers, each transformer being associated with a different one of said distributing transformers and comprising two differential windings, one of said windings being so connected that the current therethrough varies with the current flowing through the primary winding of the distributing transformer with which the balancing transformer is associated and the other one of said windings being so connected that the current therethrough is proportional to the current supplied to the primary windings of the distributing transformers which are connected to the alternating current supply circuit at points farther away from said source than the point where the primary winding of the distributing transformer associated with the balancing transformer is connected, said windings being so arranged that the flux in each transformer is zero when there is a predetermined division of current between the primary winding of the distributing transformer.

5. A system of electric distribution comprising a source of alternating current, an alternating current supply circuit connected to said source, a plurality of distributing transformers having their primary windings connected to different points of said alternating current supply circuit and their secondary windings connected to a common circuit, protective means in the secondary circuits of each transformer, and a plurality of balancing transformers, each transformer being associated with a different one of said distributing transformers and comprising two differential windings, one of said windings being connected in series with the primary winding of the distributing transformer with which the balancing transformer is associated and the other one of said windings being connected in series with said supply circuit at a point farther away from said source than the point where the primary winding of the distributing transformer associated with the balancing transformer is connected, said windings being so arranged that the flux in each transformer is zero when the primary currents of all the distributing transformers are equal.

In witness whereof, I have hereunto set my hand this 19th day of May, 1923.

EDWARD D. TREANOR.